US008078563B2

(12) United States Patent  
Adachi et al.

(10) Patent No.: US 8,078,563 B2
(45) Date of Patent: Dec. 13, 2011

(54) METHOD FOR LOCATING ROAD SHAPES USING ERRONEOUS MAP DATA

(75) Inventors: Shinya Adachi, Kanagawa (JP); Satoko Miyama, Kanagawa (JP); Naoki Yamada, Kanagawa (JP); Seiji Yoshida, Kanagawa (JP); Yukio Ichikawa, Kanagawa (JP); Takashi Kawasato, Tokyo (JP); Hiroyuki Maeda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 12/625,076

(22) Filed: Nov. 24, 2009

(65) Prior Publication Data

US 2010/0070170 A1  Mar. 18, 2010

Related U.S. Application Data

(63) Continuation of application No. 10/075,164, filed on Feb. 14, 2002, now Pat. No. 7,634,452.

(30) Foreign Application Priority Data

Aug. 27, 1999 (JP) .................................. 11-242166

(51) Int. Cl.
*G06F 17/00* (2006.01)
*G06N 5/00* (2006.01)
(52) U.S. Cl. ................. 706/46; 706/48; 706/45
(58) Field of Classification Search ........................ None
See application file for complete search history.

(56) References Cited

U.S. PATENT DOCUMENTS

| 4,040,740 | A | 8/1977 | Handtmann et al. |
| 4,063,237 | A | 12/1977 | Nier et al. |
| 4,151,656 | A | 5/1979 | Hensley |
| 4,196,474 | A | 4/1980 | Buchanan et al. |
| 4,251,797 | A | 2/1981 | Bragas et al. |
| 4,304,487 | A | 12/1981 | Odone et al. |

(Continued)

FOREIGN PATENT DOCUMENTS

EP 0 478 438 B1 12/1995

(Continued)

OTHER PUBLICATIONS

Vosselman et al., G., "Road Tracing by Profile Matching and Kalman Filtering", pp. 1-11, 1995.*

(Continued)

*Primary Examiner* — Jeffrey A Gaffin
*Assistant Examiner* — Adrian Kennedy
(74) *Attorney, Agent, or Firm* — Pearne & Gordon LLP

(57) ABSTRACT

When transmitting an on-road location on a digital map, an information provider transmits, as on-road location information, string of coordinates information representing the road shape of a road section including the on-road location having a predetermined length, additional information including at least one information item chosen from a group of the attribute information on the road including the road location and detailed information on the nodes in the road section, and relative information indicating the on-road location in the road section. Receiving party receiving this on-road location information performs shape matching to identify the road section on a digital map and uses relative data to identify the on-road location in this road section. The receiving party can identify the road shape with high accuracy even when only a small amount of string of coordinates data is available. This makes it possible to reduce the data transmission amount and identify an on-load location with high accuracy.

6 Claims, 7 Drawing Sheets

U.S. PATENT DOCUMENTS

| | | | |
|---|---|---|---|
| 4,725,957 A | 2/1988 | Alberter et al. | |
| 4,728,888 A | 3/1988 | Bauer et al. | |
| 4,729,172 A | 3/1988 | Alberter et al. | |
| 4,731,727 A | 3/1988 | Rauch et al. | |
| 4,733,179 A | 3/1988 | Bauer et al. | |
| 4,782,453 A | 11/1988 | Bauer et al. | |
| 4,784,237 A | 11/1988 | Condne et al. | |
| 4,807,127 A | 2/1989 | Tenmoku | |
| 4,807,264 A | 2/1989 | Bauer | |
| 4,819,175 A | 4/1989 | Wuttke | |
| 4,835,870 A | 6/1989 | Rauch et al. | |
| 4,893,246 A | 1/1990 | Iihoshi et al. | |
| 4,924,699 A | 5/1990 | Kuroda et al. | |
| 4,930,888 A | 6/1990 | Freisleben et al. | |
| 4,963,864 A | 10/1990 | Iihoshi et al. | |
| 4,963,865 A | 10/1990 | Ichikawa et al. | |
| 4,982,332 A | 1/1991 | Saito et al. | |
| 4,984,168 A | 1/1991 | Neukrichner et al. | |
| 4,989,333 A | 2/1991 | Helldorfer et al. | |
| 5,020,143 A | 5/1991 | Duckeck et al. | |
| 5,021,962 A | 6/1991 | Helldorfer et al. | |
| 5,040,122 A | 8/1991 | Neukirchner et al. | |
| 5,046,011 A | 9/1991 | Kakihara et al. | |
| 5,059,965 A | 10/1991 | Geiser | |
| 5,067,082 A | 11/1991 | Nimura et al. | |
| 5,095,532 A | 3/1992 | Mardus | |
| 5,146,219 A | 9/1992 | Zechnall | |
| 5,148,604 A | 9/1992 | Bantien | |
| 5,173,691 A | 12/1992 | Sumner | |
| 5,177,685 A | 1/1993 | Davis et al. | |
| 5,182,555 A | 1/1993 | Sumner | |
| 5,184,123 A | 2/1993 | Bremer et al. | |
| 5,193,214 A | 3/1993 | Mardus et al. | |
| 5,214,757 A | 5/1993 | Mauney | |
| 5,247,252 A | 9/1993 | Hamisch et al. | |
| 5,261,279 A | 11/1993 | Wolf et al. | |
| 5,279,040 A | 1/1994 | Kippelt et al. | |
| 5,283,575 A | 2/1994 | Kao et al. | |
| 5,307,278 A | 4/1994 | Hermans et al. | |
| 5,311,195 A | 5/1994 | Mathis et al. | |
| 5,332,180 A | 7/1994 | Peterson et al. | |
| 5,351,539 A | 10/1994 | Ziegenbein et al. | |
| 5,375,059 A | 12/1994 | Kyrtsos et al. | |
| 5,396,429 A | 3/1995 | Hanchett | |
| 5,406,490 A | 4/1995 | Braegas | |
| 5,416,711 A | 5/1995 | Gran et al. | |
| 5,438,687 A | 8/1995 | Suchowerskyj et al. | |
| 5,440,389 A | 8/1995 | Drabarek | |
| 5,442,559 A | 8/1995 | Kuwahara et al. | |
| 5,459,667 A | 10/1995 | Odagaki et al. | |
| 5,465,088 A | 11/1995 | Braegas | |
| 5,473,930 A | 12/1995 | Gademann et al. | |
| 5,487,009 A | 1/1996 | Hill | |
| 5,488,559 A | 1/1996 | Seymour | |
| 5,504,482 A | 4/1996 | Schreder | |
| 5,508,917 A | 4/1996 | Siegle et al. | |
| 5,515,042 A | 5/1996 | Nelson | |
| 5,523,765 A | 6/1996 | Ichikawa | |
| 5,552,990 A * | 9/1996 | Ihara et al. | 701/208 |
| 5,602,542 A | 2/1997 | Widmann | |
| 5,629,690 A | 5/1997 | Knoll | |
| 5,659,476 A | 8/1997 | LeFebvre et al. | |
| 5,703,293 A | 12/1997 | Zabler et al. | |
| 5,710,566 A | 1/1998 | Grabow et al. | |
| 5,736,941 A | 4/1998 | Schulte et al. | |
| 5,742,923 A | 4/1998 | Odagawa | |
| 5,745,865 A | 4/1998 | Rostoker et al. | |
| 5,748,107 A | 5/1998 | Kersken et al. | |
| 5,757,285 A | 5/1998 | Grabow | |
| 5,797,112 A | 8/1998 | Komatsu et al. | |
| 5,812,069 A | 9/1998 | Albrecht et al. | |
| 5,815,118 A | 9/1998 | Schipper | |
| 5,826,212 A | 10/1998 | Nagai | |
| 5,828,322 A | 10/1998 | Eberhard | |
| 5,839,087 A | 11/1998 | Sato | |
| 5,842,146 A | 11/1998 | Shishido | |
| 5,848,374 A | 12/1998 | Wakabayashi et al. | |
| 5,850,190 A | 12/1998 | Wicks et al. | |
| 5,862,511 A | 1/1999 | Croyle et al. | |
| 5,874,905 A | 2/1999 | Nanba et al. | |
| 5,899,954 A | 5/1999 | Sato | |
| 5,905,451 A | 5/1999 | Sakashita | |
| 5,908,466 A | 6/1999 | Veugen et al. | |
| 5,926,118 A | 7/1999 | Hayashida et al. | |
| 5,928,305 A | 7/1999 | Nomura | |
| 5,933,094 A | 8/1999 | Goss et al. | |
| 5,933,100 A | 8/1999 | Golding | |
| 5,948,043 A | 9/1999 | Mathis | |
| 5,974,356 A | 10/1999 | Doyle et al. | |
| 5,977,885 A | 11/1999 | Watanabe | |
| 5,990,809 A | 11/1999 | Howard | |
| 5,995,023 A | 11/1999 | Kreft | |
| 5,996,409 A | 12/1999 | Funk et al. | |
| 6,002,981 A | 12/1999 | Kreft | |
| 6,006,161 A | 12/1999 | Katou | |
| 6,012,012 A | 1/2000 | Fleck et al. | |
| 6,031,600 A | 2/2000 | Winner et al. | |
| 6,035,253 A | 3/2000 | Hayashi et al. | |
| 6,038,559 A | 3/2000 | Ashby et al. | |
| 6,061,627 A | 5/2000 | Sato | |
| 6,064,319 A | 5/2000 | Matta | |
| 6,097,313 A | 8/2000 | Takahashi et al. | |
| 6,104,480 A | 8/2000 | Matzo et al. | |
| 6,107,940 A | 8/2000 | Grimm | |
| 6,107,941 A | 8/2000 | Jones | |
| 6,108,603 A | 8/2000 | Karunanidhi | |
| 6,111,521 A | 8/2000 | Mulder et al. | |
| 6,111,523 A | 8/2000 | Mee | |
| 6,114,973 A | 9/2000 | Winner et al. | |
| 6,115,668 A | 9/2000 | Kaneko et al. | |
| 6,137,564 A | 10/2000 | Schmidt et al. | |
| 6,150,961 A | 11/2000 | Alewine et al. | |
| 6,157,342 A | 12/2000 | Okude et al. | |
| 6,163,752 A | 12/2000 | Sievers et al. | |
| 6,169,955 B1 | 1/2001 | Fultz | |
| 6,169,956 B1 | 1/2001 | Morimoto et al. | |
| 6,178,378 B1 | 1/2001 | Leibold | |
| 6,188,959 B1 | 2/2001 | Schupfner | |
| 6,192,314 B1 | 2/2001 | Khavakh et al. | |
| 6,208,268 B1 | 3/2001 | Scarzello et al. | |
| 6,212,473 B1 | 4/2001 | Stefan et al. | |
| 6,223,125 B1 | 4/2001 | Hall | |
| 6,230,099 B1 | 5/2001 | Fabian | |
| 6,230,100 B1 | 5/2001 | Geier | |
| 6,232,917 B1 | 5/2001 | Baumer et al. | |
| 6,236,336 B1 | 5/2001 | Oliva et al. | |
| 6,236,933 B1 | 5/2001 | Lang | |
| 6,240,368 B1 | 5/2001 | Kreft | |
| 6,244,111 B1 | 6/2001 | Funk | |
| 6,249,740 B1 * | 6/2001 | Ito et al. | 701/200 |
| 6,249,754 B1 | 6/2001 | Neul et al. | |
| 6,266,609 B1 | 7/2001 | Fastenrath | |
| 6,278,918 B1 | 8/2001 | Dickson et al. | |
| 6,278,928 B1 | 8/2001 | Aruga et al. | |
| 6,281,807 B1 | 8/2001 | Kynast et al. | |
| 6,281,808 B1 | 8/2001 | Glier et al. | |
| 6,292,747 B1 | 9/2001 | Amro et al. | |
| 6,293,024 B1 | 9/2001 | Fiebig et al. | |
| 6,298,303 B1 | 10/2001 | Khavakh et al. | |
| 6,321,158 B1 | 11/2001 | DeLorme et al. | |
| 6,321,162 B1 | 11/2001 | Hessing | |
| 6,324,467 B1 | 11/2001 | Machii et al. | |
| 6,324,468 B1 | 11/2001 | Meis et al. | |
| 6,324,888 B1 | 12/2001 | Schmidt et al. | |
| 6,326,887 B1 | 12/2001 | Winner et al. | |
| 6,327,532 B1 | 12/2001 | Black et al. | |
| 6,333,703 B1 | 12/2001 | Alewine et al. | |
| 6,334,089 B2 | 12/2001 | Hessing | |
| 6,345,229 B1 | 2/2002 | Honkomp et al. | |
| 6,356,836 B1 | 3/2002 | Adolph | |
| 2001/0001847 A1 | 5/2001 | Hessing | |
| 2001/0007088 A1 | 7/2001 | Winter et al. | |
| 2001/0012981 A1 | 8/2001 | Yamashita et al. | |
| 2001/0016796 A1 | 8/2001 | Ata et al. | |
| 2001/0029425 A1 | 10/2001 | Myr | |
| 2001/0037177 A1 | 11/2001 | Nishida et al. | |

FOREIGN PATENT DOCUMENTS

| | | |
|---|---|---|
| EP | 0 875 877 A2 | 11/1998 |
| EP | 1 022 578 A2 | 7/2000 |
| EP | 1 098 168 A2 | 5/2001 |
| EP | 1 102 036 A1 | 5/2001 |
| EP | 1 122 517 A2 | 8/2001 |
| EP | 1 167 923 A2 | 1/2002 |
| WO | 98/27530 A1 | 6/1998 |
| WO | 98/45724 A1 | 10/1998 |
| WO | 99/24787 A2 | 5/1999 |
| WO | 99/56081 A2 | 11/1999 |
| WO | 99/56264 A1 | 11/1999 |
| WO | 00/08616 A1 | 2/2000 |
| WO | 00/49530 A1 | 8/2000 |
| WO | 00/50845 A1 | 8/2000 |
| WO | 01/18768 A1 | 3/2001 |
| WO | 01/18769 A1 | 3/2001 |
| WO | 01/50089 A1 | 7/2001 |
| WO | 01/50437 A1 | 7/2001 |
| WO | 01/75838 A1 | 10/2001 |
| WO | 01/84081 A1 | 11/2001 |
| WO | 02/04894 A1 | 1/2002 |
| WO | 02/14788 A1 | 2/2002 |
| WO | 02/16874 A1 | 2/2002 |

OTHER PUBLICATIONS

Taylor et al. G., "Virtual Differential GPS & Road Reduction Filtering by Map Matching", ION GPS '99, pp. 1-10, Sep. 14-17, 1999.*

* cited by examiner

FIG. 5A

NODE STRING INFORMATION

| TOTAL NUMBER OF NODES n |
| --- |
| NODE NUMBER p1 |
| LONGITUDE |
| LATITUDE |
| NODE NUMBER p2 |
| RELATIVE COORDINATE x2 |
| RELATIVE COORDINATE y2 |
| ⋮ |
| NODE NUMBER pn |
| RELATIVE COORDINATE xn |
| RELATIVE COORDINATE yn |

FIG. 5B

ADDITIONAL INFORMATION

| ROAD TYPE CODE (EXPRESSWAY, NATIONAL HIGHWAY OR ETC.) |
| --- |
| ROAD NUMBER (NATIONAL HIGHWAY 246 OR ETC.) |
| NUMBER OF CROSSING INFORMATION ITEMS |
| NODE NUMBER p2 |
| NUMBER OF CONNECTING LINKS TO p2 l2 |
| ANGLE 1 OF CONNECTING LINKS TO p2 |
| ⋮ |
| ANGLE l2 OF CONNECTING LINKS TO p2 |
| NODE NUMBER p6 |
| NUMBER OF CONNECTING LINKS TO p2 l6 |
| ANGLE 1 OF CONNECTING LINKS TO p6 |
| ⋮ |
| ANGLE l6 OF CONNECTING LINKS TO p6 |

METHOD FOR LOCATING ROAD SHAPES USING ERRONEOUS MAP DATA

This application is a continuation of U.S. Pat. application Ser. No. 10/075,164 filed Feb. 14, 2002, which is incorporated herein by reference in its entirety.

BACKGROUND OF THE INVENTION

1. Field of the Invention

The present invention relates to an information transmission method for reporting on-road location information such as traffic jams and accidents in a traffic information provision system, and in particular to such a method that can correctly report a location on a digital map.

2. Description of the Related Art

In recent years, the number of vehicles that have car-mounted navigation apparatus has been increasing rapidly. The car-mounted navigation system has a digital map database and is capable of displaying the map around the vehicle on a screen based on the latitude/longitude data received by a GPS receiver as well as displaying the travel locus and the result of search for a route to the destination on the map.

In Japan, digital map databases are prepared by several companies. The problem is that map data contains errors inherent in the reduced-scale maps. Some of the maps on the market drawn on the scale of 1:25000 contains errors of about 50 meters depending on the location, and the errors vary with digital maps available from those companies.

Latitude/Longitude data obtained from a GPS receiver may contain errors of several tens of meters.

Some models of car-mounted navigation apparatus on the market receive traffic jam information and accident information from a traffic information provision system and display the traffic jam and accident locations on the map or performs route search using such information as additional search conditions.

In a prior traffic information provision system, as shown in FIG. 8, traffic information is provided from a traffic information collecting center 71 that has local jurisdiction over an area to an information delivery center 72. Traffic information edited for each transmission medium including FM broadcasts, road beacons and cell phones is transmitted via respective media.

The traffic information collecting center 71 exchanges traffic information with a traffic information collecting center 78 in other areas to collect traffic information in a wide service area including the peripheral areas.

In the traffic information, for example, in case latitude/longitude data on the location is presented alone in order to report a traffic jam location or accident location, various errors are contained depending on the kind of digital map database of the car-mounted navigation apparatus as mentioned earlier. Thus, different locations on the road could be recognized as the accident location by the car-mounted navigation apparatus retaining a digital map database from Company A and the car-mounted navigation apparatus retaining a digital map database from Company B.

In order to alleviate incorrect information transmission, as shown in FIG. 9A, crossings a, b on a road network are assumed as nodes, and a road c connecting the nodes as a link. Each node is assigned a node number uniquely representing the node (a=1111, b=3333). Each link is assigned a link number uniquely representing the link (c=11113333). The node numbers and link numbers thus assigned are stored in the digital map database of each company, in correspondence with each crossing and road.

Traffic information represents a point on the road by first specifying a link number then the distance in meters from the start of the link. For example, a representation "Location 200 meters from the start of the road with link number=11113333" allows the user to obtain the location P on the same road by tracing the road with link number=11113333 as far as 200 meters from the node with node number 1111, irrespective of what digital map data is used by the car-mounted navigation system in question.

Node numbers and link numbers defined on a road network must be changed to new numbers in case a road d is constructed or a road is modified as shown in FIG. 9B. Such modifications to node numbers and link numbers require updating of digital map data from each company.

Construction of and modification to a road continue into the future. As long as on-road location representation is made using node numbers and link numbers, maintenance of digital map databases is permanently accompanied by huge workload and resulting costs.

The information delivery center must send information that complies with past node numbers and link numbers for a predetermined period, for example three to five years, as well as the information of the latest year, in order to support navigation systems sold in the past. This causes huge maintenance workload.

In order to solve such problems, the inventor of the invention has proposed a location information transmission method that can report a location on a digital map without excessive maintenance workload (JP2001-041757 A).

In this location information transmission method, an information provider transmits on-road location information by using road shape data consisting of string of coordinates representing the road shape of a road section including the on-road location having a predetermined length and relative data indicating the on-road location in the road section. A party receiving the on-road location information performs shape matching to identify the road section on the digital map and uses relative data to identify the on-road location in this road section.

For example, in case a traffic jam has occurred in the section A to B on the road shown in FIG. 6, the road shape of the road including the section is displayed in a string of coordinates consisting of 601 points in 5-meter intervals, $P_0(x_0, y_0), P_1(x_1, y_1), \ldots, p_{600}(x_{600}, y_{600})$. Here, $x_k$ and $y_k$ are latitude and longitude data of the on-road point $P_k$ acquired from the digital map database retained by the information provider. Further, the distance $l_1$ from the point $P_0(x_0, y_0)$ to the traffic jam start point A and the distance $l_2$ from the point $P_0(x_0, y_0)$ to the traffic jam end point B are obtained and the road shape data: $(x_0, y_0) (x_1, y_1), \ldots, (x_{600}, y_{600})$ and traffic jam distance data: $l_1$ to $l_2$ m are generated as location information. This location information is converted to a predetermined transmission format and sent to the receiving party.

The receiving party that has received this information performs shape matching of map data in the digital map database retained by the receiving party and the received map shape data, and identifies the map shape on its own digital map. The receiving party identifies the traffic jam section to be displayed on its digital map based on the distance data from the start point of the road section.

FIG. 7 shows an example of shape matching.

Roads Q, R included within the error range around the $P_0$ $(x_0, y_0)$ point of map data read from the digital map database 7 are selected as candidates.

Then, locations $Q_0, R_0$ on each candidate road closest to $P_0$ $(x_0, y_0)$ are obtained and distance $P_0$-$Q_0$ and distance $P_0$-$R_0$ are calculated.

This operation is carried out for each point $P_1(x_1, y_1), \ldots, P_{600}(x_{600}, y_{600})$ and the road section where the summation value of the root mean square of the distances from each point $P_0, P_1, \ldots, p_{600}$ is smallest is obtained.

Then the section $l_1$-$l_2$ meters from the start point of the road section is identified as a traffic jam section.

In this way, it is possible for the receiving party to identify an on-road location without defining node numbers or link numbers, by providing road shape data representing a road shape using a string of coordinates. This location information can be used when traffic information is exchanged between traffic information collecting centers or when traffic information is provided from an FM station or road beacon.

This method is disadvantageous in that it requires location information on a great number of points on the road to be transmitted in order to correctly report the road shape and is consequently accompanied by huge transmit data. Reducing the number of points on the target road could invite erroneous matching at the receiving party.

SUMMARY OF THE INVENTION

The invention solves such problems and aims at providing a location information transmission method that can report a road shape by using only a small amount of data in transmitting the road shape by using location information on a plurality of points on the road.

According to the invention, when reporting an on-road location on a digital map, an information provider transmits, as on-road location information, string of coordinates information representing the road shape of a road section including the on-road location having a length that depends on the situation, additional information including at least one information item chosen from a group of the attribute information on the road including the road location and detailed information on the nodes in the road section, and relative information indicating the on-road location in the road section. A party that has received this on-road location information performs shape matching to identify the road section on a digital map and uses the relative data to identify the on-road location in this road section.

In this way, by transmitting additional information together with string of coordinate information, the receiving party can identify the road shape with high accuracy even when only a small amount of string of coordinate data is available. This makes it possible to reduce the amount of data transmissions and identify an on-load location with high accuracy.

BRIEF DESCRIPTION OF THE DRAWINGS

FIGS. 5A and 5B show the structure of data transmitted via a location information transmission method according to the embodiment of the invention;

DESCRIPTION OF THE PREFERRED EMBODIMENTS

A location information transmission method in an embodiment of the invention, information that already exists in a digital map database is used to transmit a road shape to the distant party.

This location information transmission method uses nodes and interpolation points for nodes included in a digital map database, as a plurality of points on a road representing string of coordinates. The nodes are on-road points specified in correspondence with crossings, entrances/exits of tunnels, entrances/exits of bridges and boundaries of administrative districts. The interpolation points are points specified to reproduce the road shape across nodes.

Figure 2A:
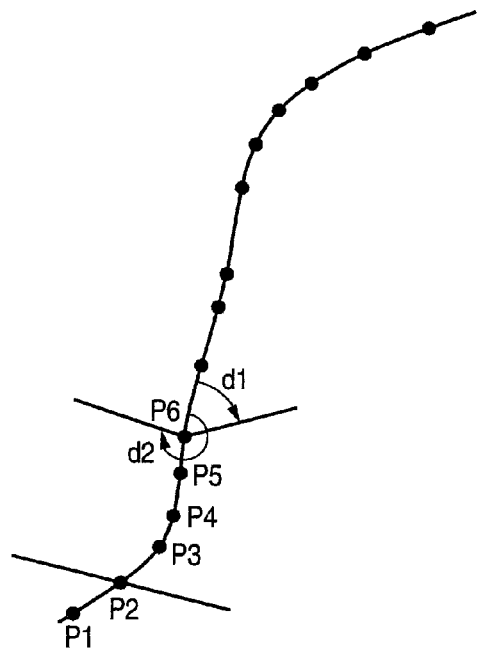
FIG. 2A shows nodes and interpolation points as well as connecting link angles at crossing nodes in a location information transmission method according to the embodiment of the invention.

FIG. 2A illustrates $P_1, P_2, P_3, \ldots$ as nodes and interpolation points on a digital map. Of these points, $P_2$ and $P_6$ indicating crossings are nodes and the other point are interpolation points.

The location information transmission method transmits, as additional information, detailed information on road types, road numbers or crossing nodes that already exists in a digital map database, on top of the string of coordinate information on the nodes and interpolation points.

Figure 2B:
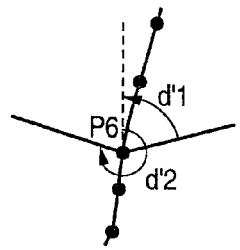
FIG. 2B shows connecting link angles by way of another method.

The road type is information to distinguish between expressways, national highways, and major local highways. The road numbers are numbers assigned to roads, such as National Highway 246. Detailed information on crossing nodes includes the number of crossing links that connect to the node and the angle of crossing links that connect to the node. The number of crossing links of the crossing node $P_6$ in FIG. 2A is 2. The angle of connecting links is represented as $d_1, d_2$ formed by the links. The angle between connecting links may be represented as $d'_1, d'_2$ measured with respect to the true north of each link (dotted line) as shown in FIG. 2B.

The additional information includes crossing names used for crossing nodes and information on entrances/exits of tunnels, entrances/exits of bridges and boundaries of administrative districts represented by nodes.

The additional information includes information on the accuracy level of the base map such as data obtained from the map on a scale of 1 to 25,000 or 10,000, in order to provide a standard for accuracy of transmitted information.

In the location information transmission method, from the viewpoint of reducing the data amount, length of a string of node/interpolation point coordinates to be acquired from the periphery of the event location is changed and the coordinates of interpolation points that contribute less to the improvement of accuracy in shape matching are omitted.

Generally, in case the road density is high and a number of roads are running in parallel, the receiving party tends to suffer from erroneous matching thus making it more difficult to perform correct shape matching. Thus, the location information transmission system retrieves the road density of the periphery of the event location and presence/absence of roads running in parallel with the target road when acquiring a string of coordinates of nodes and interpolation point from the periphery of the event location. The method then acquires a longer string of coordinates of node/interpolation point in case erroneous matching is likely to result by also considering the accuracy level of the map, and a shorter node/interpolation point string of coordinates in case erroneous matching is unlikely to result.

Interpolation point omitting processing determines whether the interpolation points are to be omitted in accordance with the omitting conditions that are based on the distance and the angle. An interpolation point is omitted only when the bearing has changed by less than an angle of α (degrees) from the preceding node or interpolation point against the bearing and the distance from the preceding node or interpolation point is less than β (m).

Figure 3A:
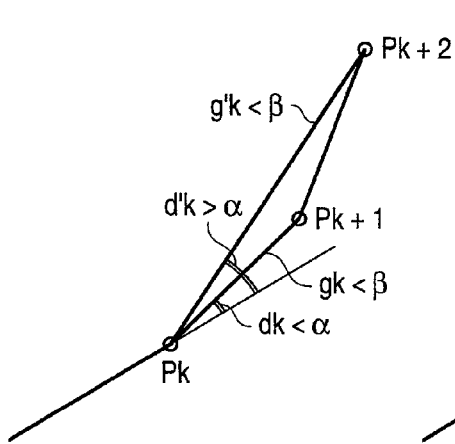
FIGS. 3A and 3B are explanatory drawings of the processing for omitting the interpolation points in a location information transmission method according to the embodiment of the invention.

In FIG. 3A, the interpolation point $P_{k+1}$ is omitted because the bearing $d_k$ from the interpolation point is less than α and the distance $g_k$ from the interpolation point $P_k$ is less than β. For the next interpolation point $P_{k+2}$, it is determined whether the bearing $d'_k$ and the distance $g'_k$ from the interpolation point $P_k$ satisfy the thinning-out conditions. In fact, the distance $g'_k$ is shorter than β but the bearing deviation $d'_k$ is larger than α so that the interpolation point $P_{k+2}$ is not omitted.

Figure 3B:
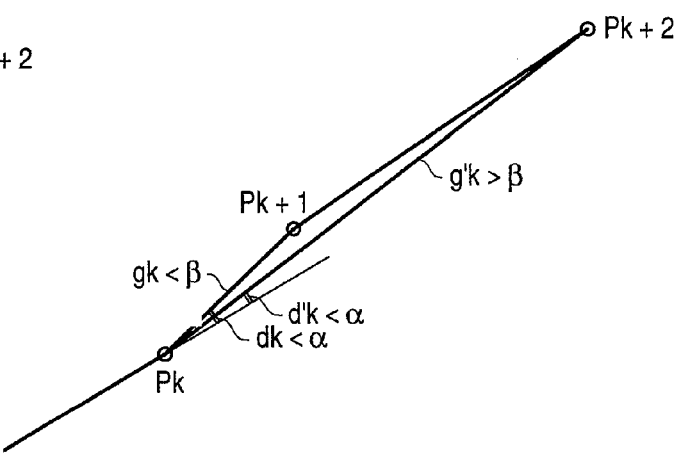

In the case of FIG. 3B, the interpolation point $P_{k+1}$ is omitted. For the interpolation point $P_{k+2}$, the bearing deviation $d'_k$ is smaller than α but distance $g'_k$ is longer than β, so that the interpolation point $P_{k+2}$ is not omitted.

Figure 4:
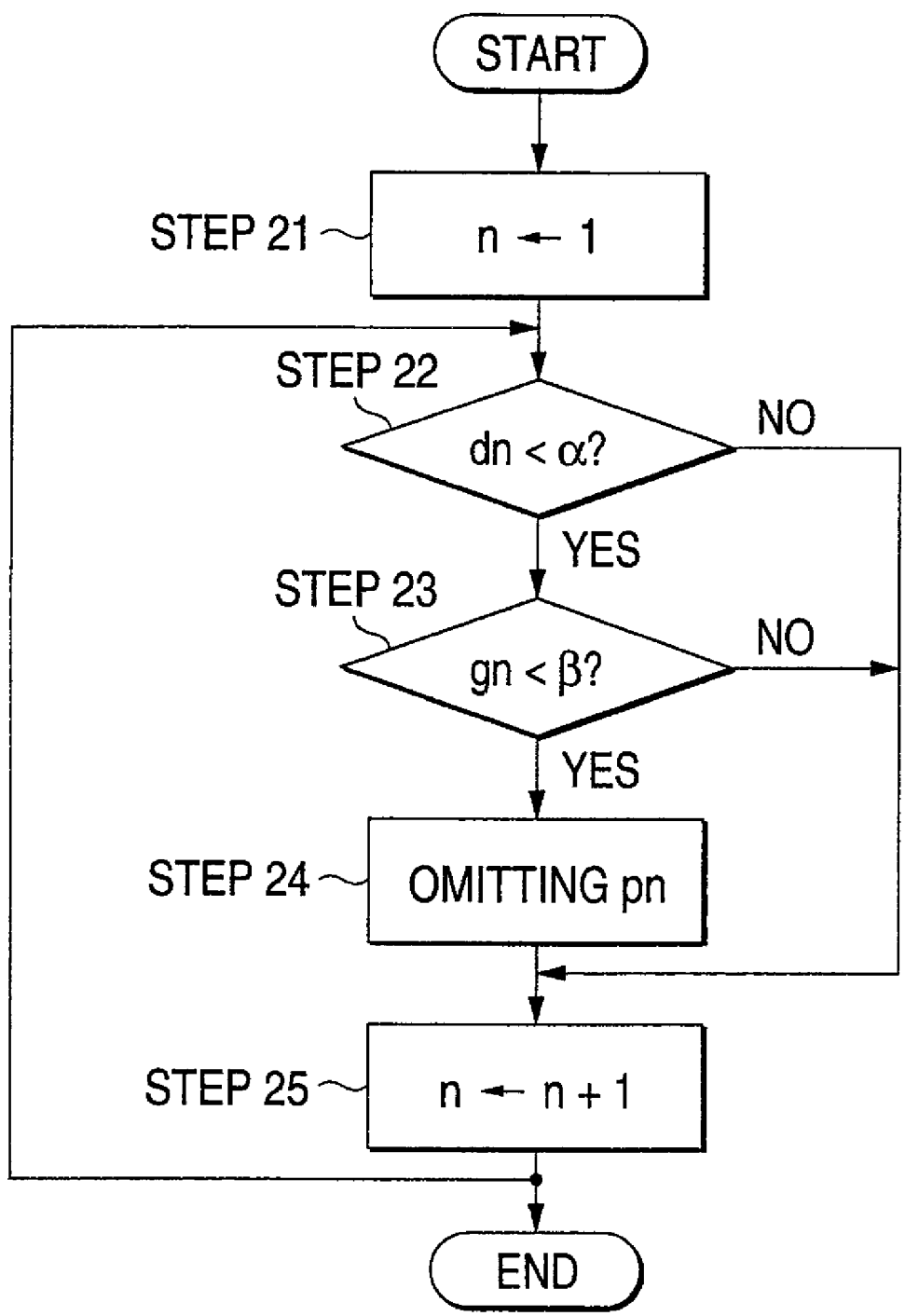
FIG. 4 is a flowchart showing the procedure for omitting portions of data from transmit data in a location information transmission method according to the embodiment of the invention.
Figure 6:
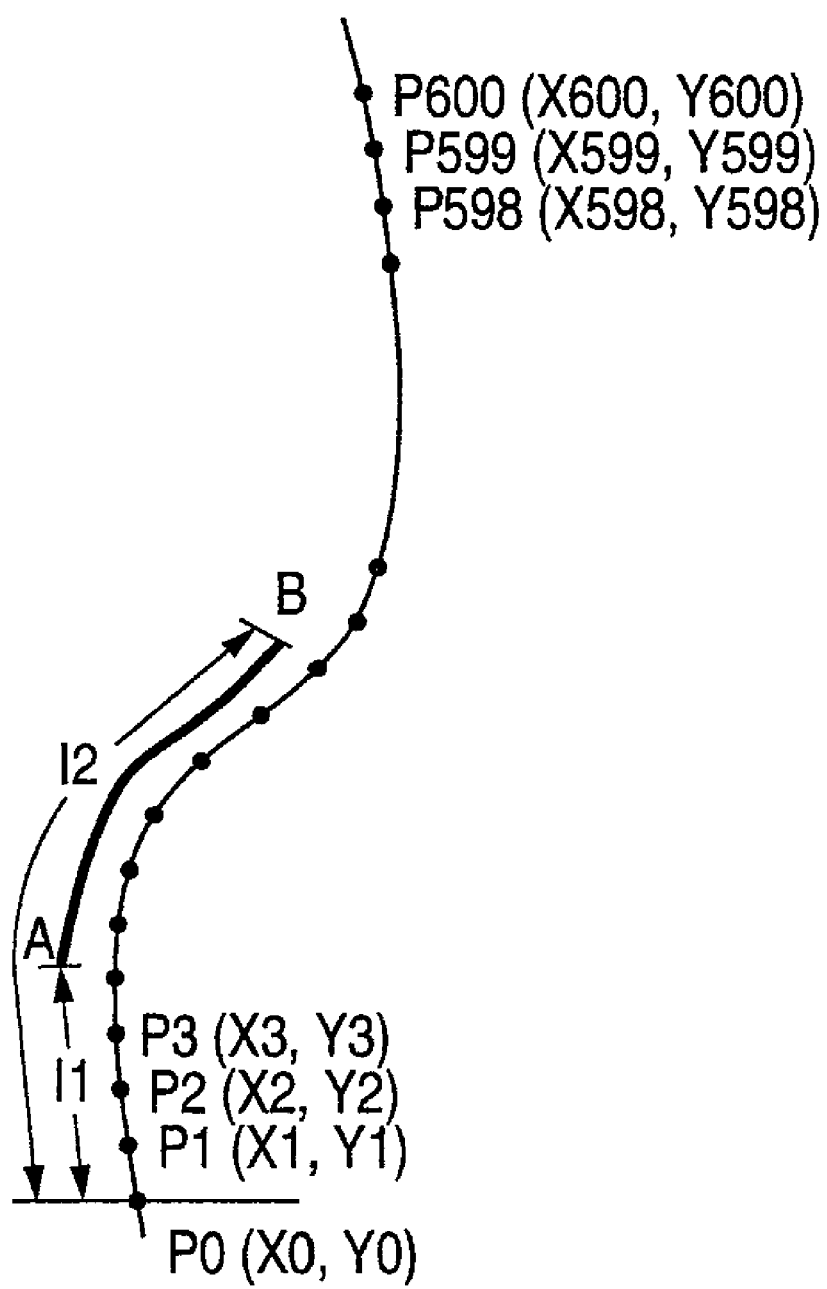
FIG. 6 is an explanatory drawing of road shape data and distance data constituting the on-road location information in a location information transmission method previously proposed.

FIG. 4 shows the flow of the thinning-out procedure.

(Step 21:) For the interpolation point $P_n$ where n=1, (Step 22:) it is determined whether the bearing deviation $d_n$ from the preceding interpolation point or node is smaller than α. In case it is smaller than α, (Step 23:) it is determined whether the distance $g_n$ from the preceding interpolation point or node is shorter than β. In case it is shorter than β, (Step 24:) the interpolation point $P_n$ is omitted.

(Step 25:) Processing of Step 22 through 24 is repeated for interpolation points $P_n$ where n is incremented by 1.

In case $d_n$ is larger than α in Step 22, and in case $g_n$ is longer than β, execution proceeds to Step 25 without omitting the interpolation point $P_n$.

FIGS. 5A and 5B show the data structure of a string of coordinates of the node and interpolation point data (node line information) obtained after omitting the interpolation points and the corresponding additional information.

The node string information in FIG. 5A assumes the nodes and interpolation points on the target road as nodes. In the node string information, longitude/latitude data of the position $P_1$ is entered as coordinate values of the first node number $P_1$. Longitude/Latitude data of the positions $P_2, \ldots, P_n$ as well as difference data $(x_2, y_2), \ldots, (x_n, y_n)$ from the longitude/latitude data of the position $P_1$ is entered as coordinate values of the next and subsequent node numbers $P_2, \ldots, P_n$. In this way, by representing the second and subsequent node positions in relative coordinates, it is possible to reduce the data amount.

While relative coordinate is represented by using differences from the longitude/latitude of the position $P_1$ in this example, it is possible to represent relative coordinates in difference from the immediately preceding node (for example difference from $P_{n-1}$ in the case of $P_n$). By doing so, it is possible to further reduce the data amount in the data line information.

The additional information in FIG. 5B displays the road type code, road number of the target road and the number of crossings representing the number of crossing nodes included in the additional information. Moreover, for crossing nodes, the additional information displays the node number ($P_2$) linked to the node string information, the number of connecting links (12) to the crossing node ($P_2$), the connecting link angle of the first connecting link (1) to the crossing node ($P_2$), . . . , the connecting link angle of the twelfth connecting link (12) to the crossing node ($P_2$) respectively for each crossing node.

The node line information and the additional information are used to set the road shape of a predetermined road section. The relative data is used to set the on-road location in the road section to be identified.

Figure 1A:
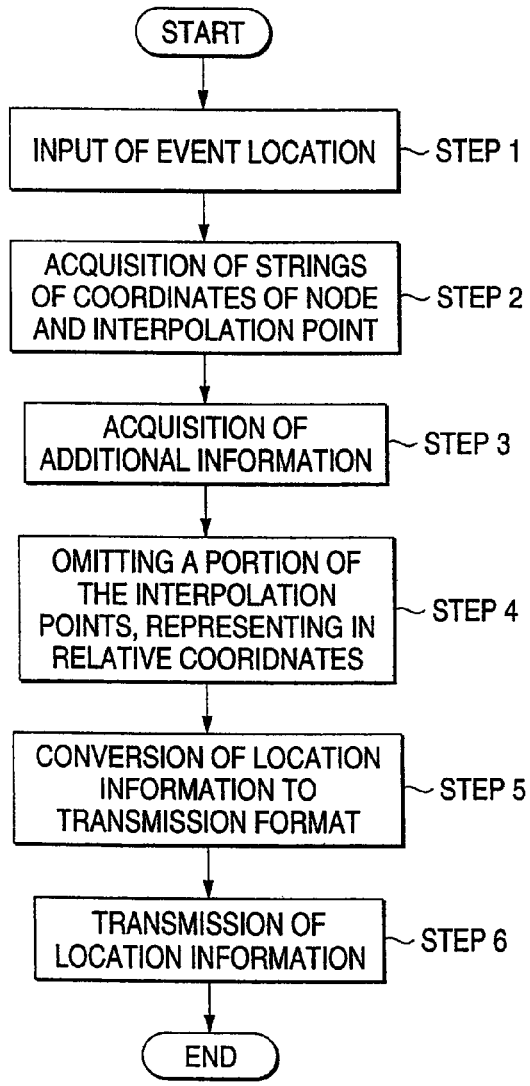
FIG. 1A shows a flowchart of the procedure at the sending party for implementing a location information transmission method according to the invention.
Figure 1B:
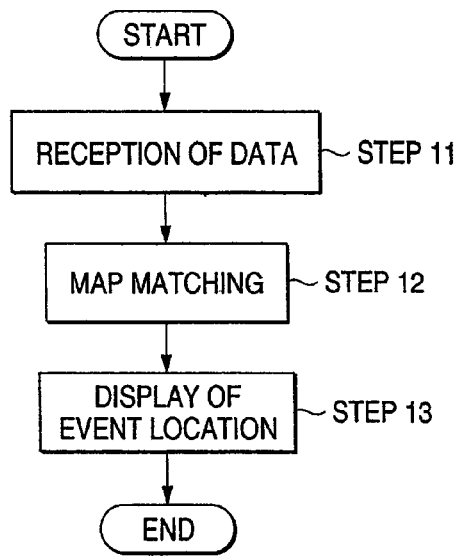
FIG. 1B shows a flowchart of the procedure at the receiving party for implementing a location information transmission method according to the embodiment of the invention.

FIGS. 1A and 1B show flowcharts of the procedures at the sending party and the receiving party for implementing the location information transmission method.

The sending party, (Step 1:) on input of the location of an on-road event such as a traffic jam or an accident, (Step 2:) acquires the string of coordinates of the nodes and interpolation points on the periphery of the event location from the digital map database retained by the sending party, (Step 3:) acquires the additional information from the digital map database, (Step 4:) omits the interpolation points, represents the resulting string of coordinates of nodes and interpolation points after omitting the interpolation points in relative coordinates, generates node string information, (Step 5:) converts the node string information and additional information representing the road section as well as the relative data representing the event location in the road section to the transmission format, (Step 6:) and transmits the resulting information.

The receiving party (Step 11:) upon receiving data, (Step 12:) performs shape matching by checking the received node string information and additional information against the data in a digital map database retained by the receiving party, and identifies the road section corresponding to the transmitted road shape information.

Figure 7:
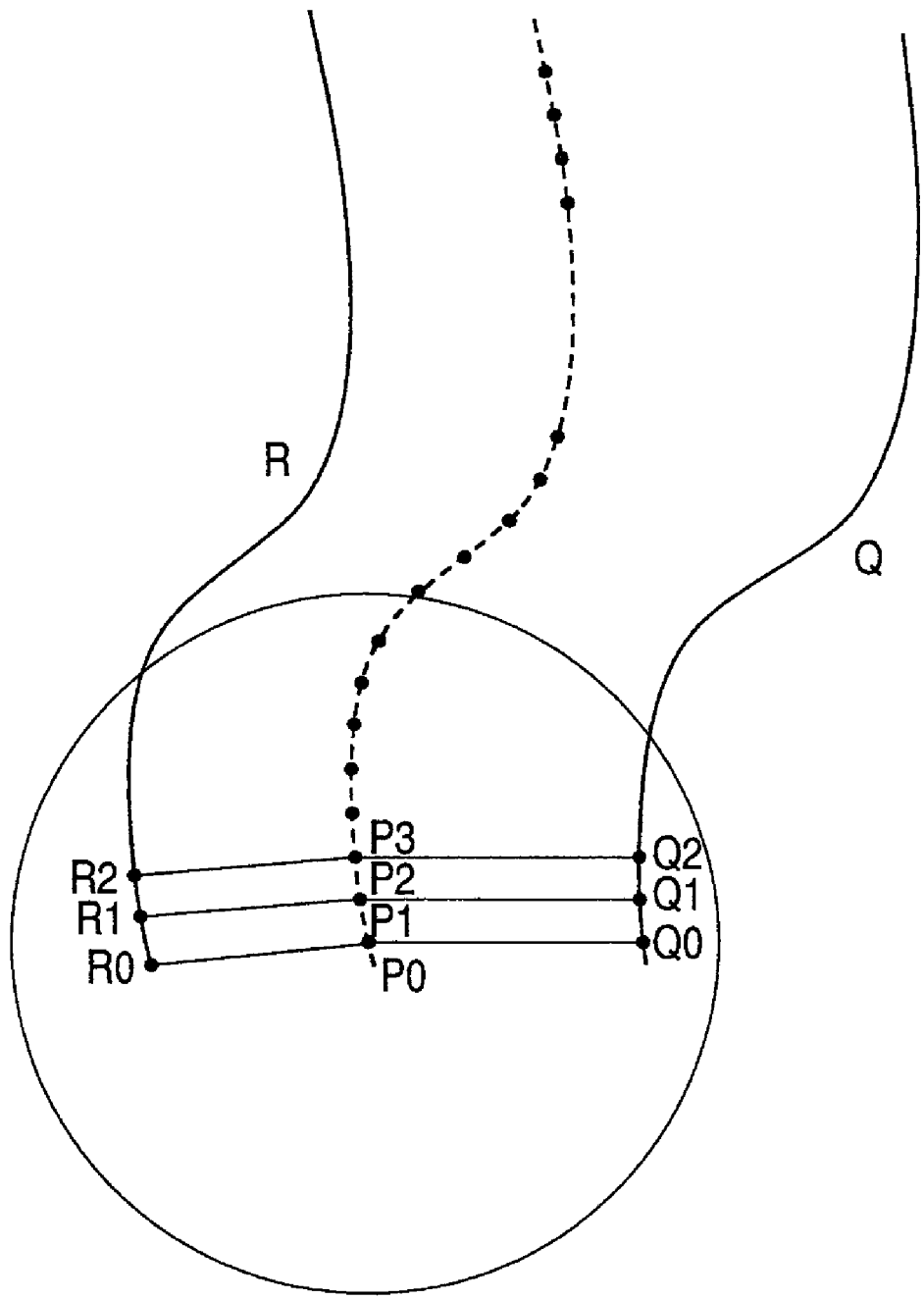
FIG. 7 is an explanatory drawing showing an example of shape matching.
Figure 8:
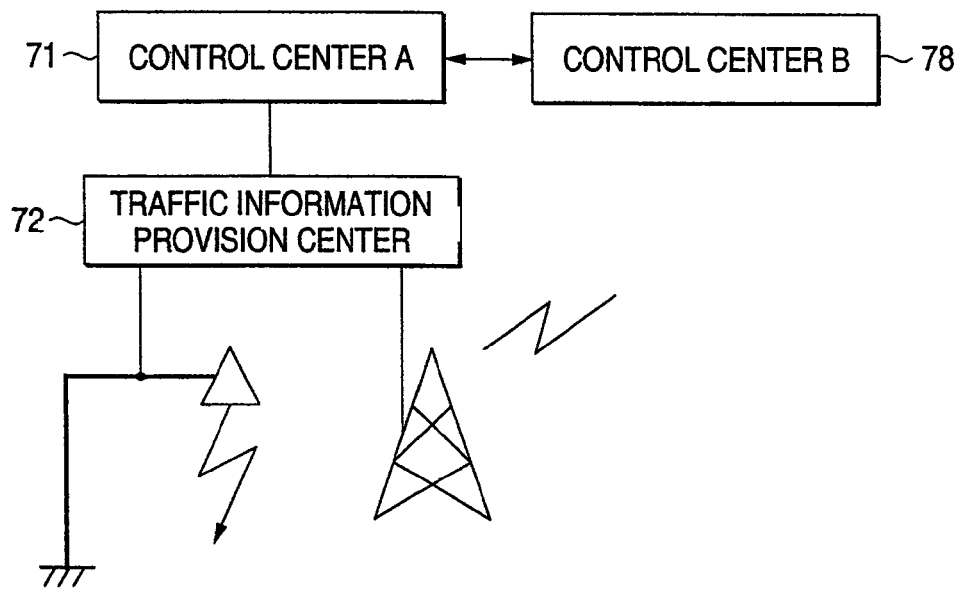
FIG. 8 is an explanatory drawing showing a traffic information provision system.
Figure 9A:
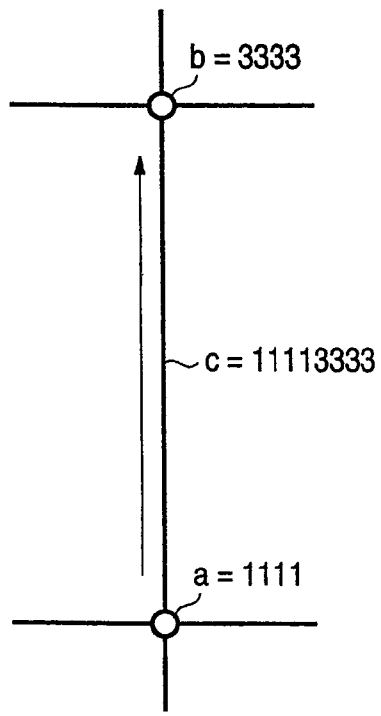
FIG. 9A is an explanatory drawing of node numbers and link numbers.
Figure 9B:
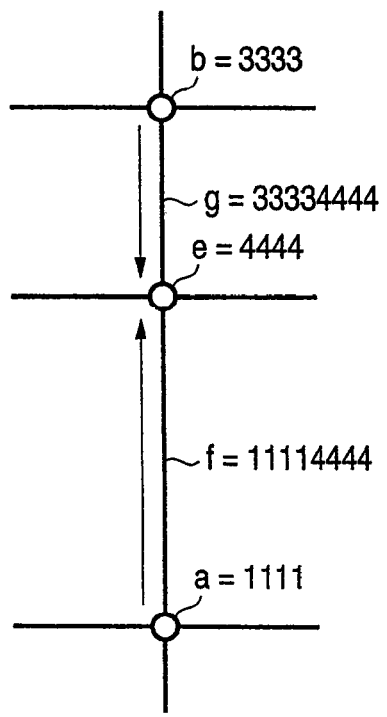
FIG. 9B is an explanatory drawing of modifications to node numbers and link numbers made when a new road is constructed.

The shape matching can be made using the approach shown in FIG. 7 as mentioned earlier. In this practice, it is possible to limit the candidate roads based on the road type code and the road number in the additional information. When the locations $Q_k$, $R_k$ on each candidate road corresponding to the location $P_k$ having each node number in the node line information is obtained while $P_k$ is a crossing node, it is possible to check the received data against the crossing information on the crossings located in the close vicinity of $Q_k$, $R_k$ thereby removing the nonconforming roads from the candidate roads. This obtains the corresponding road section quite accurately and quickly.

(Step 13:) The receiving party, identifying the target road section, verifies the event location in the identified road section based on the relative data representing the event location, then displays the event location in the display screen.

In this way, according to the location information transmission method, additional information is transmitted so that it is possible for the receiving party to correctly grasp the on-road location on a digital map even when the data amount in the string of coordinates is reduced.

It is of course possible to use some location information represented on a digital map beside traffic information as long as the location information is calculated by using shape matching. The location information transmission method may be also used in the following applications:

Shape data other than road data (house shape, river shape, administrative boundary, contour line) is used together with additional information to transmit location information.

When a plurality of events are adjacent to each other, a plurality of events are defined in a single shape data item to reduce the information amount.

More than one reference points are defined on shape data. Each event point off the road is represented in distance and direction from each reference point. Shape data matching is made, then the off-road event points are obtained using the distance and direction from each reference point obtained anew.

As understood from the foregoing description, a location information transmission method according to the invention can correctly transmit the location on a digital map to a distant party without using node numbers or link numbers on a road network. The method transmits additional information as well as node line information. This substantially reduces the amount of data transmission necessary for reporting location information and allows the receiving party to grasp the location quite accurately and quickly.

With this method, it is possible to substantially reduce workload and costs for maintenance of digital map databases thus reducing the social costs for maintaining the traffic information provision system.

The invention claimed is:

1. A system for identifying a location of a road segment in digital maps, each map containing errors inherent in the reduced-scaling of the digital maps and/or depending on the kind of the digital maps, the digital maps including a first digital map and a second digital map, the second digital map showing the road segment at a different location from the first digital map due to the errors, the system comprising:
the transmitting apparatus that has the first digital map and transmits the location information which indicates the road segment on the first digital map to the receiving apparatus; wherein the location information including: coordinates information which indicates a list of coordinates of points on the road segment, attribute information about the points or the road segment, and relative information which indicates a location where a traffic event occurred on the road segment, and
the receiving apparatus that has the second digital map wherein after the receiving apparatus receives the location information from the transmitting apparatus, the receiving apparatus identifies the location of the road segment on the second digital map by using the coordinates information and the attribute information included in the location information and identifies the location of the traffic event on the road segment on the second digital map by using the relative information included in the location information.

2. The system according to claim 1,
wherein the attribute information indicates any one of:
a road type,
a road number,
toll highway code,
number of traffic lanes,
regulation information,
road width,
intersection name,
number of connecting links to a crossing point, and
connection angle of each connecting link to a crossing point.

3. A transmission apparatus adapted for operating as the transmitting apparatus of the system according to claim 1.

4. A receiving apparatus adapted for operating as the receiving apparatus of the system according to claim 1.

5. A method for identifying a location of a road segment in digital maps, each map containing errors inherent in the reduced-scaling of the digital maps and/or depending on the kind of the digital maps, the digital maps including a first digital map and a second digital map, the second digital map showing the road segment at a different location from the first digital map due to the errors, the method comprising:
transmitting the location information which indicates the road segment on the first digital map from the transmitting apparatus; wherein the location information including: coordinates information which indicates a list of coordinates of points on the road segment, attribute information about the points or the road segment, and relative information which indicates a location where a traffic event occurred on the road segment;
receiving the location information from the transmitting apparatus at the receiving apparatus;
identifying the location of the road segment on the second digital map by using the coordinates information and the attribute information included in the received location information at the receiving apparatus, and
identifying the location of the traffic event on the road segment on the second digital map by using the relative information included in the received location information at the receiving apparatus.

6. The method according to claim 5,
wherein the attribute information indicates any one of:
a road type,
a road number,
toll highway code,
number of traffic lanes,
regulation information,
road width,
intersection name,
number of connecting links to a crossing point, and
connection angle of each connecting link to a crossing point.

* * * * *

UNITED STATES PATENT AND TRADEMARK OFFICE
CERTIFICATE OF CORRECTION

PATENT NO. : 8,078,563 B2  
APPLICATION NO. : 12/625076  
DATED : December 13, 2011  
INVENTOR(S) : Shinya Adachi et al.

Page 1 of 1

It is certified that error appears in the above-identified patent and that said Letters Patent is hereby corrected as shown below:

On the title page, item (30) Foreign Application Priority Data, delete "Aug. 27, 1999 (JP) ........................ 11-242166"

Signed and Sealed this
Eighteenth Day of February, 2014

Michelle K. Lee
*Deputy Director of the United States Patent and Trademark Office*